INVENTOR
R. H. MAYNE
BY Lucian C. Canepa
ATTORNEY

May 8, 1962 R. H. MAYNE 3,033,452
COUNTER
Filed Aug. 19, 1959 3 Sheets-Sheet 2
FIG. 2B
| CHANGE SETS | CODE ASSIGNMENTS |
|---|---|
| A | 00 |
| B | 01 |
| C | 10 |
| D | 11 |
FIG. 3B
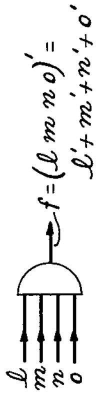
FIG. 2A
| SEQUENCE OF NUMBERS | CHANGE REQUIRED TO OBTAIN NEXT NUMBER IN THE SEQUENCE | TYPES OF CHANGES OR CHANGE SETS |
|---|---|---|
| 000 | S1 | A |
| 001 | S2 − R1 | B |
| 010 | S1 | A |
| 011 | S3 − R2 − R1 | C |
| 100 | S1 | A |
| 101 | S2 − R1 | B |
| 110 | S1 | A |
| 111 | R3 − R2 − R1 | D |
| 000 | S1 | A |
FIG. 3A
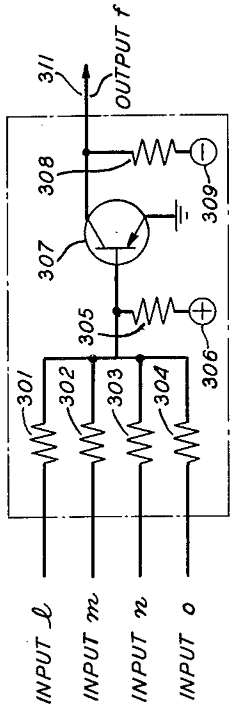
INVENTOR
R. H. MAYNE
BY Lucian C. Canepa
ATTORNEY INVENTOR
R. H. MAYNE
BY Lucian C. Canepa
ATTORNEY

United States Patent Office 3,033,452

Patented May 8, 1962

3,033,452

COUNTER

Robert H. Mayne, Millington, N.J., assignor to Bell Telephone Laboratories, Incorporated, New York, N.Y., a corporation of New York Filed Aug. 19, 1959, Ser. No. 834,785

12 Claims. (Cl. 235—92)

This invention relates to the processing of digital information and more particularly to double-rank counting circuits.

In digital information processing systems, counting may be defined as that process which records the number of pulse-type signals that occur in succession on a single line. When the pulse-type signals are of a binary nature, the counting function may be performed by a circuit which includes a number of bistable storage elements, such as, for example, flip-flops.

One well-known type of counting circuit includes a group of flip-flops to a lowest order one of which are applied the pulses to be counted. Each time that this first flip-flop or digit counter changes from a "1" to a "0" indication, in response to an input signal, a pulse-type signal representing a carry is sent to the second or next higher order digit counter. When the second digit counter transfers to a "0" representation, a pulse or carry signal is sent to the next digit counter in the group, and so on in a similar manner for all of the bistable elements in the counting arrangement. The time required for the carry signals to progress or ripple through several orders of the counter in a step-by-step fashion may be objectionably long. For example, when a three-digit counter indicates "011" and one additional pulse to be counted is received, the digit counters must change successively, one at a time, to the representation "100."

The objectionable time lag required for this first type of counter to present the new count or total may be eliminated through the use of a second type of well-known counter circuit in which AND circuits and delay units are combined with bistable elements to form a configuration in which a pulse input point is coupled through the AND circuits to every one of the bistable elements.

The first one of the AND circuits of this second type of counter is associated with the lowest order digit counter and is connected to the output thereof in a manner such that the application of an input signal to the lowest order element will, in the case where the element was previously set to the value "1," pass a signal through the first AND circuit to the next higher order digit counter. More generally, a pulse is sent on from a given digit counter to the next higher order digit counter in the arrangement each time that the given counter is in the "1" state and a pulse is applied thereto.

Carry signals in this second type of counter have to pass through a series of AND circuits to reach any of the digit counters except the first one. But, this passage will, as a practical matter, be much more rapid than the successive operations of a number of digit counters.

In the second type of counter, a given bistable element may, during the interval of the actual count, be called upon to accept new information from its input side but to provide old information to the AND circuit connected to its output side. For example, in a three-digit counter standing at "010," the application of an input pulse (new information) to the input side of the lowest order digit counter will cause that element to change to a "1" indication. If that "1" signal, rather than the previous "0" representation (old information), were coupled, before the input pulse had terminated, to the AND circuit associated with the first digit counter, a "1" signal would be applied to the second digit counter, and the counter circuit would, as a result, step or race to an erroneous count.

This possibility of error in the operation of the second type of counter may be largely guarded against by combining with each bistable element a transient memory. Such a memory must have the ability to remember the state of its associated bistable element for a time related to the width of an input pulse.

Delay or time-limited storage units can and have served satisfactorily as transient memories in synchronous digital information processing systems, i.e., systems in which all operations take place under the control of a master clock. However, in asynchronous systems, i.e., systems in which there is no fixed time reference for the execution of the operations, it is obviously risky to depend upon delays or memories characterized by time-limited storage.

The aforementioned risk has led to the development of counters embodying a nontransient or positive memory philosophy. In particular, in one such type of counter circuit, there is associated with each primary digit counter of a group or rank of digit counters a secondary storage element whose function is to remember the state of the associated primary element during any interval in which the primary element is in a state of change. That is, $n$ secondary elements serve merely for positive temporary intermediate storage of the information in $n$ primary elements. With this type of arrangement, which has been aptly termed a double-rank counter, no delay devices are needed to insure reliable operation. Note that the basic logical principles of double-rank counters are described in an article by W. H. Ware in the October 1953 issue of the Proceedings of the I.R.E., at pages 1429 through 1437.

An object of the present invention is an improved counting circuit.

More specifically, an object of this invention is a nonracing counting circuit in which carry ripple does not occur.

Another object of the present invention is a counting circuit which embodies a nontransient or positive memory philosophy.

Still another object of this invention is a high speed, double-rank counting circuit which requires relatively few logical components.

These and other objects of the present invention are realized in an illustrative embodiment thereof which includes two ranks or groups of bistable elements or units, one rank, which indicates the true count, including $n$ such elements, but the other or coded rank, which stores a compact representation of the essential portion of the information in the first rank, including only $m$ such elements, where $m \geqq \log_2 (n+1)$.

Connecting the outputs of the true rank bistable elements to the inputs of the bistable elements forming the coded rank is a first group of $n+1$ gating elements. Similarly, a second group of $n+1$ gating elements connects the outputs of the coded rank to the inputs of the true rank.

A coded double-rank counting circuit illustratively embodying the principles of this invention is designed to operate in a two-part cycle in response to the application thereto of an input pulse having two noncoincident components or representations. Illustratively, the first component of a given input pulse to be counted is applied to an input of each of the $n+1$ gating elements connected between the true rank outputs and the coded rank inputs. This first component gates a compact representation of the present true count to the $m$ element rank, the representation in the $n$ element rank remaining unchanged and continuously available to other circuitry during this first phase or part of the cycle of operation of the counting circuit.

The second phase of the cycle of operation is initiated by the application of the second component of the given input pulse to an input of each of the $n+1$ gating elements connected between the coded rank outputs and the true rank inputs. This second component gates the information in the coded rank to the bistable elements of the true rank and results in a simultaneous complementing of the appropriate bits of the true rank, thereby to properly increment the count indicated therein.

The concept of storing a coded compact representation of the true count in an auxiliary rank of bistable elements is based on the recognition that, although each of a plurality of consecutive numbers has a unique successor number, all the possible changes which need be made in the numbers in counting through them in succession may be represented by a number of change sets which are fewer in number than the successor numbers. Thus, for example, in the binary number system, the successor of any number A may be derived from information which indicates the digits in A which are less significant than the least significant zero in A. Complementing these least significant digits, including the least significant zero, will form the successor number.

More particularly, the successor to the binary number 0100111 may be derived from information which indicates that the first three right-hand digits are less significant than the least significant zero in the number. The digits appearing to the left of the least significant zero are "don't care" values, for they are not changed in the process of forming the successor number. This may be verified by observing that the successor to 0100111 is 0101000.

Since every number of the form *xxx*0111, where *x* indicates a "don't care" value, is incremented in the same way, viz., by changing the four right-hand digits thereof, all such numbers may be said to fall within the same change set. In other words, given that two numbers are within a given change set, the corresponding digits of the numbers are changed in the same way to obtain the respective successor numbers, regardless of the exact identities of the numbers.

An inspection of an $n$ digit binary number reveals that the zeros and ones of which it is composed may be arranged in a group of $2^n$ unique combinations. A close study also reveals, however, that there are only $n+1$ different types of changes required to progress from any given $n$ digit number in the group to its successor. If, therefore, each different types of change is assigned a code designation, it is seen that an $m$ digit register, where $m$ is the least integer satisfying the expresison $2^m \geqq n+1$, will be capable of storing the necessary number of different code designations. $m \geqq \log_2(n+1)$ is, of course, only another way of expressing the above relationship.

It is noted that, in an $n$ digit binary register, it may not be necessary under certain circumstances, such as, for example, when employing the binary-coded decimal system, to generate all of the $2^n$ unique combinations which the register is capable of representing. Under such circumstances, the number of gating elements interconnecting the outputs of the true rank bistable elements and the inputs of the bistable elements forming the coded rank may be less than $n+1$. Additionally, the number of gating elements connecting the outputs of the coded rank to the inputs of the true rank may then be less than $n+1$. Also, the number of change sets completely representative of the less-than-$2^n$ combinations will be less than $n+1$. Therefore, in such cases, the number $m$ of bistable elements in the coded rank register may be specified as the least integer satisfying the expression $m \geqq \log_2$ (required number of different change sets).

Furthermore, note that, in some counting applications utilizing double-rank counters embodying the principles of the present invention, it may be advantageous to initially, i.e., when the counter is first turned on, have the $m$ digit register thereof represent a compact coded indication of the word initially present in the true rank register. In such applications, the first component of a two-phase input signal is applied to the gating elements interconnecting the coded rank outputs and the true rank inputs, thereby to change the indication in the true rank register to the next representation in the desired counting sequence. Then, the second component of the input signal is applied to the gating elements interconnecting the true rank ouputs and the coded rank inputs, thereby to change the representation in the $m$ digit rank to a compact coded indication of the new word in the $n$ digit register.

One feature of the present invention is a counting circuit of the double-rank type in which a true count rank includes $n$ bistable elements, but in which the second rank, which registers a coded compact representation of the true count, includes fewer than $n$ bistable elements.

Another feature of this invention is a double-rank $n$ digit counting circuit including a main register comprising $n$ bistable elements, an auxiliary register comprising $m$ bistable elements, where $m \geqq \log_2(n+1)$, circuitry interconnecting the registers, and an input source for coupling pulses to the interconnecting circuitry, whereby one component of an input pulse sets the auxiliary register to a coded compact representation of the information in the main register, and another component of the same input pulse, in combination with the coded information in the auxiliary register, changes the information in the main register to the next representation in the desired counting sequence.

Another feature of the present invention is a double-rank counter including a true count register having $n$ bistable units, an auxiliary register having $m$ bistable units, where $m \geqq \log_2$ (required number of different change sets), and circuitry interconnecting the registers for setting the auxiliary register to a coded compact representation of the information stored in the true count register.

Still another feature of the invention is a combustion including a true count register having $n$ bistable units, an auxiliary register having $m$ bistable units, where $m<n$ and circuitry interconnecting the registers for switching selected ones of the $n$ units, the selection taking place in response to the application to the circuitry of one of the representations of a two-phase input pulse and being dependent upon the setting of the units in the auxiliary register, whereby selected ones of the bistable units of the true count register are thereby simultaneously switched to the proper states to represent the digits of the next number in a given counting sequence.

In accordance with the principles of the present invention, the counting of electrical signals is performed by means of a nonracing circuit of the double-rank type which is faster and which requires fewer component parts than heretofore considered possible.

A complete understanding of the present invention and of the above and other features thereof may be gained from a consideration of the following detailed description of illustrative embodiments thereof and the accompanying drawing, in which:

FIGS. 2A and 2B are tables specifying the coding techniques embodied in the arrangement shown in FIG. 1;

FIG. 3A is a diagram of the basic circuit or building block of one of the technologies out of which embodiments of the present invention may be formed;

FIG. 3B is a symbolic depiction of the circuit of FIG. 3A; and

Figure 1:
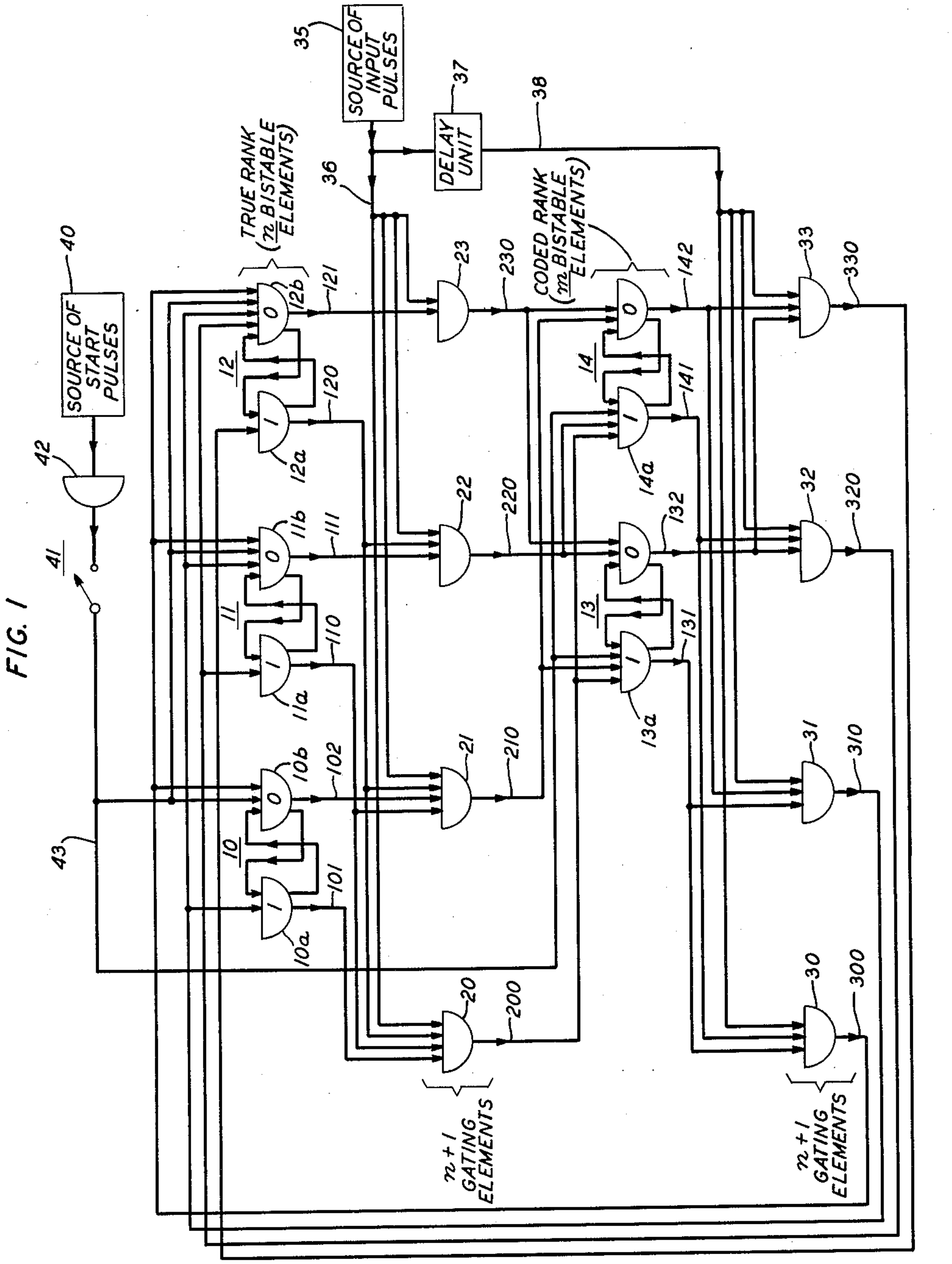
FIG. 1 is a block diagram of a specific illustrative embodiment of the principles of the present invention.

Referring now to FIG. 1, there is shown an illustrative double-rank counting circuit made in accordance with the principles of this invention. The circuit includes a true register or rank of bistable elements and an auxiliary or coded rank of bistable elements. In order to provide a basis for a clear presentation of this invention, the specific circuit shown in FIG. 1 has been chosen as one for which $n$, the number of bistable elements in the true or main rank, equals 3 and $m$, the number of bistable elements in the coded rank, equals 2. It is emphasized, however, as will be discussed hereinbelow, that $n$ may advantageously be chosen to be an integer greater than 3. Indeed, the advances represented by this invention over prior art double-rank counters become more evident when $n$ assumes such larger values.

The true rank of the counting circuit shown in FIG. 1 includes bistable units or elements 10, 11 and 12 and the coded rank thereof includes bistable units 13 and 14. The units 10 and 13 store, respectively, the most significant digits of the two numbers which the ranks are capable of registering, and the units 12 and 14 store, respectively, the least significant digits thereof.

Connecting the outputs of the true rank units 10, 11 and 12 to the inputs of the coded rank units 13 and 14 are four, i.e., $n+1$, gating elements 20, 21, 22 and 23. Similarly, a second group of four $(n+1)$ gating elements 30, 31, 32 and 33 connects the outputs of the coded rank units 13 and 14 to the inputs of the true rank units 10, 11 and 12.

FIG. 1 also depicts a source 35 of input pulses and a delay unit 37. An output path 36 of the source 35 is directly connected to an input of each of the gating elements 20, 21, 22 and 23. The path 36 is also connected through the delay unit 37 to an input of each of the gating elements 30, 31, 32 and 33. Thus, each time that the source 35 couples a pulse to the path 36, the pulse appears at the inputs of the gating elements 20, 21, 22 and 23 and, some time later, a delayed representation of that pulse appears at the inputs of the gating elements 30, 31, 32 and 33. The application of two noncoincident representations of a given input pulse to the counting circuit of FIG. 1 provides the basis for that circuit to operate in a so-called two-phase or two-beat manner.

Also shown in FIG. 1 is a source 40 of start pulses, a logic element 42, and a "clear-to-start" switch 41.

Before proceeding to a detailed description of the mode of operation of the circuit of FIG. 1, it is important to develop an understanding of the coding techniques embodied therein. FIGS. 2A and 2B are included to serve that purpose. Also, FIGS. 3A and 3B, which designate a type of building block out of which FIG. 1 may be formed, will be described before proceeding to the description of the operation of FIG. 1.

FIG. 2A is a table in whose first column is listed a sequence of binary numbers, starting with 000 and proceeding in increments of one back to 000 again. In the second column of the table of FIG. 2A are listed in symbolic form the changes that must be made in progressing from any one of the numbers of the sequence to the next higher number thereof. Thus, for example, there appears in the second column, adjacent to the top 000 of the sequence, the symbol S1. S1 is intended to indicate that the first or right hand or least significant digit of the number 000 must be set or changed to "1" to form the next number, viz., 001, of the sequence. Similarly, there appears adjacent to 001 the notation S2—R1 which means that the second or middle digit of 001 must be set to "1" and the first digit reset to "0" to form the next number, viz., 010, of the sequence. The third number, viz., 010, may be changed to its successor by following the instruction S1, i.e., by setting the first digit to "1," thereby forming the successor number 011. The other notations in the second column of FIG. 2A are believed to be easily understandable in view of the explanation above.

The third column of FIG. 2A indicates that only four types of changes need be made in progressing through the sequence of numbers listed in the first column. These four unique types or change sets are designated A, B, C and D, respectively. Thus, the letter A, which appears in the same row with each of the numbers 000, 010, 100, and 110, signifies that the same type of change must be made in each of those numbers to obtain its successor. Accordingly, it may be said that 000, 010, 100, and 110 are members of the same change set. Similarly, it may be observed that 001 and 101, 011, and 111 are the members of the change sets B, C and D, respectively.

The existence of four change sets may be uniquely represented by a two-digit binary number. This is illustrated by the table of FIG. 2B, wherein each of the change sets A, B, C and D has associated therewith a different two-digit number or code assignment.

Thus, it is seen, for the case of $n$ equal to 3, that the auxiliary or coded rank of a counter made in accordance with the principles of this invention may include one fewer bistable unit than is required in prior art double-rank counters. It is noteworthy that the saving of auxiliary rank bistable units, in accordance with the teachings of the present invention, becomes far more significant as $n$ increases in value. For example, when $n$ equals 63, $m$ need to be only 6.

The basic building block of any one of a number of transistor or magnetic core logic technologies may be employed to form double-rank counting circuits in accordance with the principles of the present invention. One such suitable technology is that designated transistor-resistor logic or T.R.L., the basic circuit of which is shown in FIG. 3A. Note that T.R.L. circuits are described in an article entitled "Transistor NOR Circuit Design," by W. D. Rowe and G. H. Royer in volume 76, part I, of the Transactions of the American Institute of Electrical Engineers, Communications and Electronics, July 1957, pages 263 through 267.

The circuit shown in FIG. 3A includes input resistors 301, 302, 303 and 304 to the left-hand ends of which are applied input signals $l$, $m$, $n$ and $o$, a base bias resistor 305, a positive base bias source 306, a p-n-p transistor 307, a collector bias resistor 308, a negative collector bias source 309, and a path 311 on which an output $f$ appears.

FIG. 3B, which is a symbolic depiction of the circuit of FIG. 3A, includes a Boolean algebra notation, viz., $f=(lmno)'=l'+m'+n'+o'$, that specifies the functional relationship between the output signal $f$ and input signals $l$, $m$, $n$ and $o$. The notation indicates that the output signal will be a "1" (represented by ground potential) if any one or more of the input signals is a "0" (represented by a high negative potential), and that the output signal will be a "0" only if every one of the input signals is a "1." From this explanation, it is evident that a circuit of the type shown in FIG. 3A, but having only one input lead, acts as an inverter, that is a "0" signal input is converted to a "1" signal output, and vice versa. Such circuits, whether they include one or more input leads, are typically referred to as AND-NOT elements.

Returning now to FIG. 1, let us assume that in the absence of a pulse to be counted, i.e., a "1," on the path 36, that path is at the proper potential to represent "0." Under such conditions, assume further that it is desired to set or clear the true rank register to 000 and to set the coded rank to the representation 11, although, as will be clear from the explanation given below, the counter to be described will operate in a completely satisfactoy manner if the coded rank initially indicates any one of the four combinations which it is capable of representing. Such setting may, for example, be done by means of the source 40 of "1" signals, the AND-NOT element 42, and the switch 41. Closing the switch 41 results in an inverted output of the source 40 being coupled to an output path 43, which inverted or "0" signal is then directed to an input of each of the bistable units 10, 11, 12, 13 and 14.

Each of the bistable units 10, 11, 12, 13 and 14 comprises two AND-NOT elements, interconnected in the manner shown in FIG. 1. In accordance with well-recognized practice, one (herein, the right-hand element) of each of the bistable units has been assigned the label "0," which is intended to indicate that a bistable unit represents the state or condition "0" when its right-hand element has a "1" signal output. Similarly, a bistable unit represents the state "1" when its left-hand element has a "1" signal output.

The "0" signal output of the element 42 causes each of the bistable units 10, 11 and 12 to switch to its "0" state. More specifically, the output of the element 42 is coupled to the element 10_b_, thereby to cause it to provide a "1" signal on its output path 102; is coupled to the element 11_b_, thereby to cause it to provide a "1" signal on its output path 111; and is coupled to the element 12_b_, thereby to cause it to provide a "1" signal on its output path 121. Also, the "0" signal output of the element 42 is directed to the left-hand or "1" state elements of the coded rank bistable units. More specifically, the output of the element 42 is coupled to an input of the element 13_a_, thereby to cause it to provide a "1" signal on its output path 131; and is coupled to an input of the element 14_a_, thereby to cause it to provide a "1" signal on its output path 141.

Figure 4:
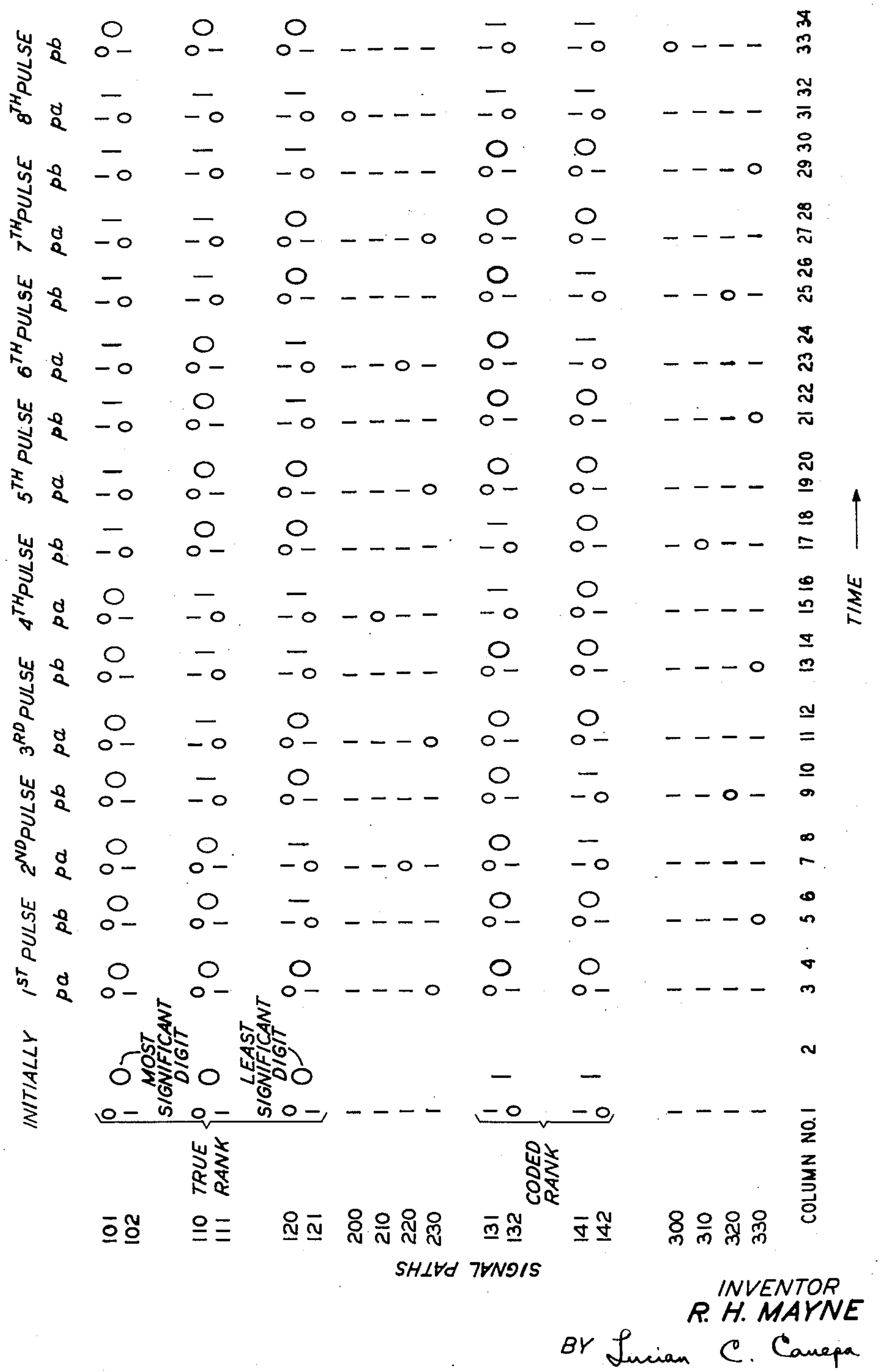
FIG. 4 is a timing diagram illustrating the mode of operation of the embodiment of FIG. 1.

In column 1 of FIG. 4 are shown the signals which initially (i.e., after the switch 41 has been closed) appear at the outputs of the bistable units 10, 11, 12, 13 and 14 and at the outputs of the gating elements 20, 21, 22, 23, 30, 31, 32 and 33. This pattern of signals is such as to cause the true rank units to register 000 and the coded rank units to register 11, as indicated in column 2 of FIG. 4.

Assume now that the switch 41 is opened and that the source 35 of input pulses couples a "1" signal to the path 36 and thereby to an input of each of the gating elements 20, 21, 22 and 23. There will then appear on the output paths 200, 210, 220 and 230 of the elements 20, 21, 22 and 23 the signals "1," "1," "1" and "0," respectively, as indicated in the third column of FIG. 4. These signals in turn are coupled to the inputs of the bistable units 13 and 14 and cause those units to switch from the indication 11 to 00. (Note that the pattern of input signals to the units 13 and 14 is such that, regardless of their initial representation, they will be switched to the indication 00 following the application to the counter of the first component of the first electrical signal to be counted.) During this time, it is assumed that the delayed representation of the "1" input pulse is not yet available on the output path 38 of the delay unit 37. Accordingly, a "0" is coupled to an input of each of the gating elements 30, 31, 32 and 33, thereby causing those elements to provide on the signal paths 300, 310, 320 and 330 the output pattern "1," "1," "1" and "1," respectively, which, being the same as the initial output pattern of those elements, will not cause the bistable units 10, 11 and 12 to switch from their initial representation, viz., 000. This set of conditions is represented in columns 3 and 4 of FIG. 4.

Thus, following the appearance of the first representation $p_a$ of the first input pulse, there appears in the coded rank the code 00, which, as described above in connection with FIGS. 2A and 2B, may be the assigned code for the change set A.

The wiring of the counting circuit shown in FIG. 1 is arranged such that, in response to the appearance of the second or delayed representation $p_b$ of the first input pulse, the signals gated by the elements 30, 31, 32 and 33 to the bistable units 10, 11 and 12 cause the 000 representation stored therein to be changed to 001, i.e., cause the instruction S1 to be implemented, thereby to indicate in binary number form that the source 35 has coupled one pulse to the path 36. Note that the state of each of the elements of the counting circuit of FIG. 1, following the application thereto of $p_b$ of the first pulse, is indicated in column 5 of FIG. 4. Similarly, FIG. 4 indicates in detail in a step-by-step manner the entire operation of the circuit of FIG. 1.

Looking at FIG. 4 from an overall viewpoint, it is seen that each time that a first representation $p_a$ of an input pulse is applied to the counter that the elements 20, 21, 22 and 23 gate the appropriate code assignment for the particular number then present in the true rank to the bistable units of the coded rank. Also, it is seen that each time that a second representation $p_b$ of an input pulse is applied to the counter that the elements 30, 31, 32 and 33, in response to $p_b$ and the code assignment then stored in the coded rank, gate change information to the bistable units of the true rank. This information simultaneously changes or complements the appropriate digits of the number in the true rank, thereby incrementing the number therein and forming a proper count or total.

The speed of operation of counting circuits made in accordance with the principles of the present invention is high due to the fact that in such circuits sequential signal propagation through relatively few logical elements is required. For example, in the specific illustrative circuit of FIG. 1, the time which must elapse between the two representations $p_a$ and $p_b$ of a given input pulse is dependent only on the switching time of the slowest one of the gating elements 20, 21, 22 and 23 plus the switching time of the slower one of the bistable units 13 and 14. Similarly, the time which must be allowed to elapse between the $p_b$ representation of one input pulse and the $p_a$ representation of a next following pulse is dependent only on the switching time of the slowest one of the gating elements 30, 31, 32 and 33 plus the switching time of the slowest one of the bistable units 10, 11 and 12. Furthermore, as the counting capacity of a circuit of the type shown in FIG. 1 is increased, by adding additional AND-NOT elements thereto in accordance with the teachings herein, the number of logical elements per longest signal propagation path does not increase over that which is characteristic of the logical organization of FIG. 1.

It is noted that in a given logic technology the number of paths which may feed the input side of a logical element or the number of circuits which may be driven from the output side thereof may, in the interest of insuring reliable switching operation, have to be kept within specified limits. When these limits, which are typically referred to as fan-in and fan-out limits, respectively, are in danger of being exceeded, such techniques as the paralleling of logical elements or a logical organization which embodies a less efficient code for the auxiliary rank than the one described herein may be found useful.

More generally, it may under certain circumstances be advantageous to form counting circuits in accordance with the principles of the present invention in which the logical organization embodies a less efficient code for the auxiliary rank than the one described in detail herein. Specifically, the auxiliary rank may then include a number of bistable units which is less than $n$ but greater than $m$. These circumstances will typically be based on standard and well-known considerations of logical design, such as, for example, switching speeds or fan-in and fan-out limits.

The circuit shown in FIG. 1, and other illustrative embodiments of the principles of this invention, may be arranged to count backwards rather than forwards. More specifically, the circuit of FIG. 1 may be so arranged by simply reversing the "0" and "1" designations in each bistable unit of the true rank. The element 10_a_ would then be labeled "0" and 10_b_ would be labeled "1"; 11_a_ and 11_b_ would be changed to "0" and "1," respectively; and 12_a_ and 12_b_ to "0" and "1," respectively.

Although the presentation herein has been mainly directed to counting in the binary number system, it is emphasized that the principles of this invention are more widely applicable. These principles are applicable to the arrangement of any positive memory circuit which is designed to count through a group of numbers in a number system of base $r$. The membership of a given number of the group in a given change set would then be determined by observing the number of digits of value $r-1$ which are less significant than the least significant digit not equal to $r-1$. All numbers in a given change set could then be incremented in a similar manner. For example, in accordance with the aforementioned rule, the decimal numbers 01329, 67849 and 00069 are seen to belong to the same change set if each of the decimal digits thereof is represented by its equivalent in the binary number system by means of four bistable elements. In each of the above decimal numbers the changes required to increment the number by one are R1, R4 and S5, as is easily determined by an inspection of Table I below, wherein are shown the binary-coded representations and the respective binary-coded successors and change sets of the above decimal numbers.

TABLE I

| | | 10000's | 1000's | 100's | 10's | 1's |
|---|---|---|---|---|---|---|
| Word | 01329 | 0000 | 0001 | 0011 | 0010 | 1001 |
| Successor Word | 01330 | 0000 | 0001 | 0011 | 0011 | 0000 |
| Change Set | | | | | S5 | R4, R1 |
| Word | 67849 | 0110 | 0111 | 1000 | 0100 | 1001 |
| Successor Word | 67850 | 0110 | 0111 | 1000 | 0101 | 0000 |
| Change Set | | | | | S5 | R4, R1 |
| Word | 00069 | 0000 | 0000 | 0000 | 0110 | 1001 |
| Successor Word | 00070 | 0000 | 0000 | 0000 | 0111 | 0000 |
| Change Set | | | | | S5 | R4, R1 |

Note that, for the example specified in Table I, it is a coded compact representation of R1, R4 and S5 that would be stored in the auxiliary register and that R1, R4 and S5 is an indication of that portion of the information present in the main register which is sufficient to produce the respective successor words when set-reset storage elements are employed. Of course, when storage elements having complementing inputs, i.e., elements each having a single input lead the application to which of successive pulses causes the element to alternately assume its two stable states, are to be employed, C1, C4 and C5, where C, indicating a complementing input, has been substituted for each R or S of the change set above, would be the sufficient information to be represented by the coded compact combination stored in the auxiliary register.

Thus, it has been shown, by means of the specific arrangements described herein, that the principles of this invention may be embodied in improved counting circuits of the double-rank type.

It is to be understood that the term "counting" as employed herein with respect to the present invention is to be construed to mean the process of producing a specified sequence of words in a circuit configuration in response to the application to the configuration of successive identical stimulations on one or more input leads thereof, and that the principles of this invention are applicable to the counting of any sequence of words. Application of these principles simply involves determining for each combination in the sequence what set of changes must be made to produce its successor combination and, also, recognizing that one change set may be representative of the successors of a plurality of words in the sequence. Then, the number $m$ of bistable storage elements required for coded representations of these change sets is given by the expression $m \geq \log_2$ (required number of different change sets).

Furthermore, it is to be understood that the specific above-described arrangements are only illustrative of the application of the principles of the present invention. Numerous other arrangements may be devised by those skilled in the art without departing from the spirit and scope of this invention.

What is claimed is:

1. A double-rank counter comprising a true count register including $n$ bistable units, an auxiliary register including $m$ bistable units, where $m$ is the least integer satisfying the expression $m \geq \log_2 (n+1)$, a pulse source, first means interconnecting said registers and responsive to a pulse from said source for setting said auxiliary register to a coded representation of a portion of the information stored in said true count register, pulse delay means connected to said pulse source, and second means connected to said pulse delay means and interconnecting said registers for switching selected ones of said $n$ units to the next representation in a desired counting sequence.

2. In combination in a double-rank counter, a true count register including $n$ bistable units, an auxiliary register including $m$ bistable units, where $m$ is the least integer satisfying the expression $m \geq \log_2 (n+1)$, and means interconnecting said registers for setting said auxiliary register to a coded representation of a portion of the information stored in said true count register.

3. A double-rank counting circuit including a main register comprising $n$ bistable units, an auxiliary register comprising $m$ bistable units where $m \geq \log_2 (n+1)$, a first group of $n+1$ gating elements connected between the outputs of said $n$ bistable units and the inputs of said $m$ bistable units, a second group of $n+1$ gating elements connected between the outputs of said $m$ bistable units and the inputs of said $n$ bistable units, and a two-phase input pulse source connected to said first and second groups of gating elements, so that the application of a first phase input pulse from said source to said first group produces output pulses from said first group which switch said auxiliary register to a coded compact indication of those properties of the count in said main register which are necessary and sufficient to permit production of the next count and the application of a second phase input pulse from said source to said second group produces output pulses from said second group which switch said main register to the next count in the counting sequence.

4. A counting circuit including a main register comprising $n$ bistable units, an auxiliary register comprising $m$ bistable units, where $m \geq \log_2$ (required number of different change sets), a first group of gating elements connected between the outputs of said $n$ bistable units and the inputs of said $m$ bistable units, a second group of gating elements connected between the outputs of said $m$ bistable units and the inputs of said $n$ bistable units, and two-phase input signal means connected to said first and second groups of gating elements.

5. In combination in a double-rank $n$ digit counter, a main register including $n$ bistable elements, an auxiliary register, including $m$ bistable elements where $m \geq \log_2 (n+1)$, means interconnecting said registers, and means for coupling two-component input pulses to said interconnecting means so that a first component of one of said input pulses sets said auxiliary register to a coded representation of information in said main register, and a second component of said one of said input pulses in combination with the coded information in said auxiliary register changes the information in said main register to the next representation in a desired counting sequence.

6. A counting circuit comprising a first rank of bistable units forming a true count register, a second rank of bistable units forming a coded count register, said second rank including fewer bistable elements than said first rank, first gating means connecting the outputs of said first rank of bistable units to the inputs of said second rank of bistable units, second gating means connecting the outputs of said second rank of bistable units to the inputs of said first rank of bistable units, means connected to said first gating means for coupling thereto a first input pulse, and means connected to said second gating means for coupling thereto a second input pulse.

7. In combination in a double-rank counting circuit, first means for registering a true count, second means for registering a coded representation of a portion of said true count, means for providing two-beat input signals, and means responsive to said coded representation in said second means and one of the beats of an input signal for incrementing the count registered in said first means.

8. In combination in a double-rank counter, true count registering means including $n$ bistable units, coded count registering means including $m$ bistable units, where $m<n$, and means interconnecting said true count and coded count registering means for setting said coded count registering means to a compact representation of a portion of the information registered in said true count registering means.

9. A double-rank counting circuit comprising means for supplying undelayed and delayed input pulses to be counted, first means for registering a true count of said pulses, second means for registering a coded compact indication of a portion of the count in said first means, first gating means connected between the outputs of said first registering means and the inputs of said second registering means and responsive to said undelayed input pulses for gating to said second registering means signals which actuate said second registering means to said coded compact indication, and second gating means connected between the outputs of said second registering means and the inputs of said first registering means and responsive to said delayed input pulses for gating to said first registering means signals which actuate said first registering means to an indication of the receipt by said circuit of said given input pulse.

10. A circuit as in claim 9 wherein said first and second registering means respectively includes $n$ and $m$ bistable units where $m \geq \log_2 (n+1)$, and wherein each of said first and second gating means includes $n+1$ gating elements.

11. A double-rank counter comprising a true count register including $n$ bistable units, an auxiliary register including $m$ bistable units, where $m$ is the least integer satisfying the expression $m \geq \log_2 (n+1)$, a pulse source, first means directly interconnecting said registers and responsive to an undelayed pulse from said source for setting said auxiliary register to a coded representation of a portion of the information stored in said true count register, pulse delay means directly connected to said pulse source, and second means directly connected to said pulse delay means and interconnecting said registers for switching selected ones of said $n$ units to the next representation in a desired counting sequence.

12. A double-rank counter comprising a true count register including $n$ bistable units, an auxiliary register including only $m$ bistable units, where $m$ is the least integer satisfying the expression $m \geq \log_2 (n+1)$, a pulse source, first means interconnecting said registers and responsive to a pulse from said source for setting said auxiliary register to a coded representation of a portion of the information stored in said true count register, pulse delay means connected to said pulse source, and second means connected to said pulse delay means and interconnecting said registers for switching selected ones of said $n$ units to the next representation in a desired counting sequence.

References Cited in the file of this patent

UNITED STATES PATENTS

| | | |
|---|---|---|
| 2,666,575 | Edwards | Jan. 19, 1954 |
| 2,845,222 | Genna et al. | July 29, 1958 |